United States Patent
Haeberle et al.

(10) Patent No.: US 10,974,241 B2
(45) Date of Patent: Apr. 13, 2021

(54) FLUID SENSING SYSTEM

(71) Applicants: TE CONNECTIVITY CORPORATION, Berwyn, PA (US); Tyco Electronics (Shanghai) Co., Ltd., Shanghai (CN)

(72) Inventors: Min Zheng Haeberle, Palo Alto, CA (US); Ting Gao, Palo Alto, CA (US); Jiankun Zhou, Shanghai (CN); James Toth, San Carlos, CA (US)

(73) Assignees: TE CONNECTIVITY SERVICES GMBH, Schaffhausen (CH); TYCO ELECTRONICS (SHANGHAI) CO., LTD., Shanghai (CN)

( * ) Notice: Subject to any disclaimer, the term of this patent is extended or adjusted under 35 U.S.C. 154(b) by 812 days.

(21) Appl. No.: 15/473,899

(22) Filed: Mar. 30, 2017

(65) Prior Publication Data
US 2018/0280973 A1 Oct. 4, 2018

(51) Int. Cl.
*B01L 3/00* (2006.01)
*C25D 21/12* (2006.01)
(Continued)

(52) U.S. Cl.
CPC ....... *B01L 3/502715* (2013.01); *B01L 3/5027* (2013.01); *B01L 3/502738* (2013.01);
(Continued)

(58) Field of Classification Search
CPC ........... B01L 3/5027; B01L 2400/0633; B01L 2300/023; B01L 2300/0663;
(Continued)

(56) References Cited

U.S. PATENT DOCUMENTS

| 6,827,831 B1 | 12/2004 | Chow et al. |
| 7,459,713 B2 | 12/2008 | Coates |

(Continued)

FOREIGN PATENT DOCUMENTS

| WO | 0169329 A2 | 9/2001 |
| WO | 0235495 A1 | 5/2002 |

(Continued)

OTHER PUBLICATIONS

International Search Report dated Jun. 6, 2018, for counterpart International Patent Application No. PCT/US2018/024773.

*Primary Examiner* — Shogo Sasaki

(57) ABSTRACT

A fluid sensing system includes a microfluidic chip, multiple sensors, and a communication device. The microfluidic chip includes at least one microfluidic channel extending a length through the microfluidic chip. The microfluidic chip is fluidly connected to a process fluid such that a fluid sample from the process fluid flows through the at least one microfluidic channel. The multiple sensors are operatively connected to the at least one microfluidic channel of the microfluidic chip. The multiple sensors are configured to monitor multiple different properties of the fluid sample within the at least one microfluidic channel. The communication device is operatively connected to the multiple sensors. The communication device is configured to receive data parameters representative of the multiple different properties of the fluid sample from the multiple sensors and wirelessly transmit the data parameters to a remote location.

14 Claims, 6 Drawing Sheets

(51) Int. Cl.
  *G01N 27/42* (2006.01)
  *G01N 27/07* (2006.01)

(52) U.S. Cl.
  CPC ........ *B01L 3/502746* (2013.01); *C25D 21/12* (2013.01); *G01N 27/42* (2013.01); *B01L 2300/023* (2013.01); *B01L 2300/0627* (2013.01); *B01L 2300/0663* (2013.01); *B01L 2300/087* (2013.01); *B01L 2300/0816* (2013.01); *B01L 2300/0867* (2013.01); *B01L 2400/0439* (2013.01); *B01L 2400/0633* (2013.01); *G01N 27/07* (2013.01)

(58) Field of Classification Search
  CPC ..... B01L 2300/0816; B01L 2400/0439; B01L 3/502715; B01L 3/502738; B01L 3/502746; B01L 2300/0627; B01L 2300/0867; B01L 2300/087; G01N 27/07; G01N 27/42; C25D 21/12
  See application file for complete search history.

(56) References Cited

U.S. PATENT DOCUMENTS

| | | |
|---|---|---|
| 8,388,833 B2 | 3/2013 | Robertson et al. |
| 2003/0109951 A1 | 6/2003 | Hsiung et al. |
| 2003/0161572 A1 | 8/2003 | Johnck et al. |
| 2005/0112542 A1 | 5/2005 | West |
| 2008/0262321 A1 | 10/2008 | Erad et al. |
| 2010/0084286 A1 | 4/2010 | West |
| 2013/0085680 A1 | 4/2013 | Arlen et al. |
| 2016/0129455 A1* | 5/2016 | Wang .................. A61B 5/1473 156/272.6 |
| 2016/0363550 A1* | 12/2016 | Koo ........................ H04L 67/10 |
| 2018/0221867 A1* | 8/2018 | Molla .................. B01L 3/5027 |

FOREIGN PATENT DOCUMENTS

| | | |
|---|---|---|
| WO | 2010062728 A1 | 6/2010 |
| WO | 2013090407 A2 | 6/2013 |
| WO | 2014042867 A1 | 3/2014 |
| WO | WO-2016/024941 A1 | 2/2016 |

* cited by examiner

FLUID SENSING SYSTEM

BACKGROUND OF THE INVENTION

The subject matter herein relates generally to fluid sensing systems that monitor various properties of fluids in fluidic processes.

Fluid baths that are used in various fluidic processes, such as electroplating, often contain multiple chemical components. The performance of the fluidic processes is dependent on the type and concentration of the chemical components in the fluid bath, as well as other properties of the fluid bath such as temperature, conductivity (e.g., for electrolyte baths), and the like. For example, the concentrations of the components, the temperature, and the conductivity of an electroplating bath may affect a rate of plating on a target object as well as characteristics of the resulting coating, such as plating thickness. In order to maintain a level of consistency in the fluid process and resulting products, various properties of the fluid bath should be monitored over time.

A conventional process for monitoring one or more properties of a fluid bath is to remove a fluid sample from the bath and perform one or more tests on the fluid sample in a lab environment. In the lab, multiple different types of tests may be performed to measure different properties of the fluid. This conventional process is inefficient and costly. For example, the different properties of the fluid bath may be measured using labor-intensive analytical processes, such as titrating. Furthermore, the time required for transport of the fluid sample to the lab and the various testing apparatuses and the performance of the multiple analytical tests results in a relatively long lag time before obtaining an analysis result for the fluid bath. Due to the lag time, cost, and/or manual effort, the properties of the fluid bath may be monitored relatively infrequently, such as once an hour, once every few hours, or once a day. The infrequent monitoring presents a risk that one or more properties of the fluid bath may deviate from a designated operating range without timely detection, resulting in the production of non-conforming products that cannot be sold and/or must be recalled. Furthermore, the significant volume of the fluid sample required for the laboratory tests may also negatively affect the properties of the fluid bath when the sample is removed from the bath. Due to the extraction of the fluid samples, the volume of the fluid bath may decrease, requiring the addition of fresh fluid. The addition of fresh fluid may increase material costs and may also undesirably modify component concentrations and other properties of the fluid bath.

A need remains for fluid sensing systems that provide frequent and efficient monitoring of multiple properties of fluids in fluidic processes for better control of the fluid bath and reduced cost.

BRIEF DESCRIPTION OF THE INVENTION

In an embodiment, a fluid sensing system is provided that includes a microfluidic chip, multiple sensors, and a communication device. The microfluidic chip includes at least one microfluidic channel extending a length through the microfluidic chip. The microfluidic chip is fluidly connected to a process fluid such that a fluid sample from the process fluid flows through the at least one microfluidic channel. The multiple sensors are operatively connected to the at least one microfluidic channel of the microfluidic chip. The multiple sensors are configured to monitor multiple different properties of the fluid sample within the at least one microfluidic channel. The communication device is operatively connected to the multiple sensors. The communication device is configured to receive data parameters representative of the multiple different properties of the fluid sample from the multiple sensors and wirelessly transmit the data parameters to a remote location.

In an embodiment, a fluid sensing system is provided that includes a microfluidic chip, multiple sensors, and a communication device. The microfluidic chip includes at least one microfluidic channel extending a length through the microfluidic chip. The microfluidic chip is fluidly connected to an electroplating bath such that a fluid sample from the electroplating bath flows through the at least one microfluidic channel. The multiple sensors are operatively connected to the at least one microfluidic channel of the microfluidic chip. The multiple sensors are configured to monitor multiple different properties of the fluid sample within the at least one microfluidic channel. The multiple sensors include at least two of an infrared sensor, a pH sensor, an electrochemistry sensor, an ultraviolet sensor, and an ultrasonic sensor. The communication device is operatively connected to the multiple sensors. The communication device is configured to receive data parameters representative of the multiple different properties of the fluid sample from the multiple sensors and wirelessly transmit the data parameters to a remote location.

In an embodiment, a fluid sensing system is provided that includes a microfluidic chip, multiple sensors, and a fluid input controller. The microfluidic chip includes at least one microfluidic channel extending a length through the microfluidic chip. The multiple sensors are mounted on the microfluidic chip and operatively connected to the at least one microfluidic channel to monitor multiple different properties of a fluid sample flowing through the at least one microfluidic channel. The fluid input controller is configured to control a flow of a first process fluid, a second process fluid, and a cleaning fluid one at a time into the at least one microfluidic channel of the microfluidic chip according to a designated protocol. The fluid input controller is configured to provide the first process fluid into the at least one microfluidic channel during a first time period, the cleaning fluid into the at least one microfluidic channel during a subsequent second time period, and the second process fluid into the at least one microfluidic channel during a subsequent third time period to monitor the different properties of both the first and second process fluids.

DETAILED DESCRIPTION OF THE INVENTION

One or more embodiments describe a fluid sensing system that integrates a microfluidic chip, multiple analytical sensors, and a wireless communication device for achieving continuous, accurate, and efficient monitoring of a fluidic process. The fluid sensing system may allow an operator to monitor the fluidic process using a mobile device, such that the operator may be at a remote location from the fluidic process and still able to monitor the process.

The microfluidic chip includes one or more microfluidic channels therethrough that receive a small sample amount of fluid (e.g., less than 10 mL or less than 1 mL) from a fluid bath of the fluidic process. The multiple analytical sensors are integrated with the microfluidic chip and positioned relative to the one or more microfluidic channels to measure different properties of the fluid sample within the channels. The fluid sample may flow through the one or more microfluidic channels such that the sensors provide continuous measurements of the corresponding properties of the fluid bath. In one or more embodiments, the multiple sensors may include a pH sensor for measuring the pH of the fluid, an infrared (IR) sensor for measuring the temperature of the fluid, an ultraviolet (UV) sensor for measuring the concentration of various components (e.g., additives) in the fluid, an electrochemistry module sensor for providing electrochemical analytical measurements, and/or the like. The communication device may transmit status signals, which include data parameters associated with one or more of the monitored properties of the fluid, to a remote location such as a server. Operators may be able to access the data parameters that are stored at the remote location via cloud computing and mobile data transfer to allow the operators to receive real-time updates regarding the conditions of the fluid bath on mobile devices.

One or more technical effects of the embodiments described herein include a cost savings due to avoiding the use of expensive conventional analytical instruments. Another technical effect is a reduction in the risk of human error via the use of an automated system. Yet another technical effect is the availability of real-time continuous monitoring of fluid conditions which allows for better control over the conditions and properties of the fluid. Still another technical effect is a reduced interference on the fluid bath by extracting only a very small sample amount of fluid into the microfluidic chip for analysis.

Figure 1:
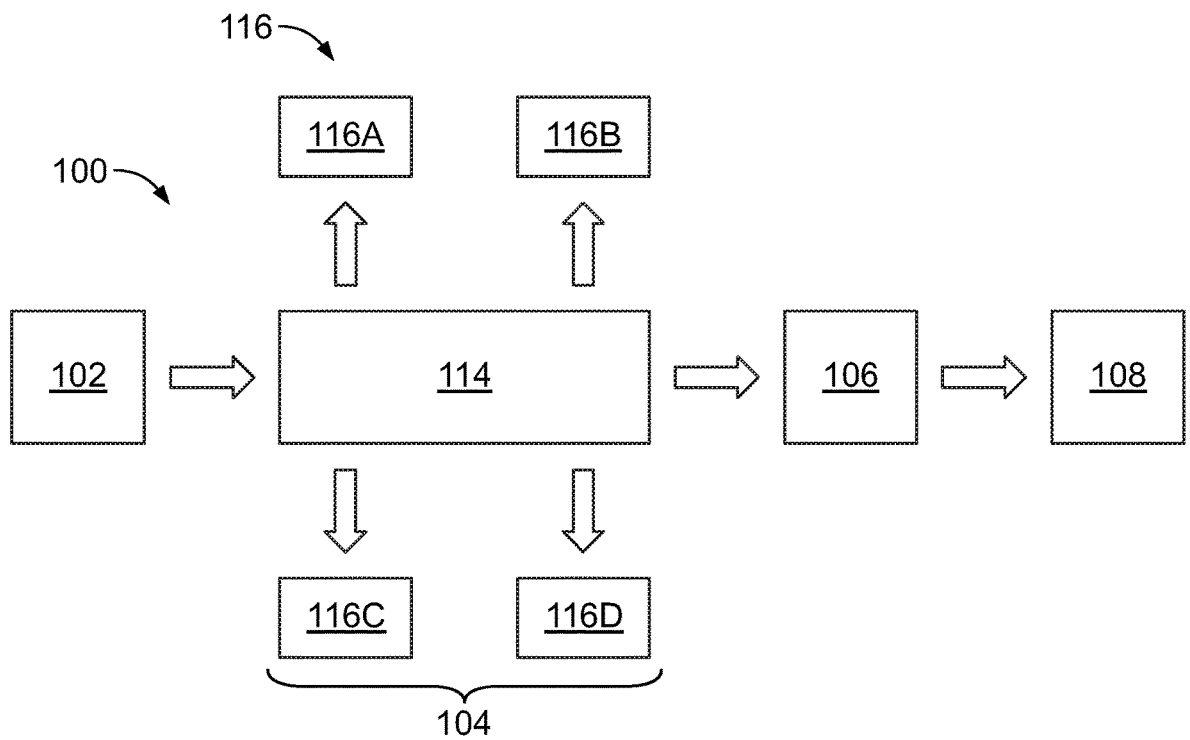
FIG. 1 illustrates a monitoring system according to an embodiment.

FIG. 1 illustrates a monitoring system 100 according to an embodiment. The monitoring system 100 in FIG. 1 includes a fluidic processing device 102, a fluid sensing system 104, a server 106, and one or more operator input/output (I/O) devices 108. The fluidic processing device 102 contains a process fluid (e.g., the process fluid 110 shown in FIG. 5) contained within a reservoir (e.g., the reservoir 112 shown in FIG. 5) of the device 102. In an alternative embodiment, the process fluid may be contained within a network of tubes of the device 102. The fluid sensing system 104 is fluidly connected to the process fluid and is configured to monitor multiple different properties of the process fluid using a microfluidic chip 114 and multiple different sensors 116 operatively connected to the microfluidic chip 114. The fluid sensing system 104 is configured to transmit data parameters representative of the monitored properties of the process fluid to the server 106. The server 106 stores the received data parameters. The operator I/O device 108, which may be a personal computer, a laptop computer, a desktop computer, a tablet computer, a smartphone, a wearable computing device, or the like, may receive the data parameters from the server 106 and display the data parameters to an operator using a display of the I/O device 108. The I/O device 108 may be located proximate to the server 106 or remote from the server 106, and may communicate wirelessly with the server 106. Therefore, an operator located remote from the fluidic processing device 102 may be able to monitor the conditions of the process fluid in real-time using the operator I/O device 108. Although only one operator I/O device 108 is illustrated in FIG. 1, the server 106 may be configured to communicate, via a wired or wireless connection, with multiple operator I/O devices 108.

In one embodiment, the fluidic processing device 102 is an electroplating apparatus 102 and the process fluid is an electrolyte bath contained within a reservoir of the electroplating apparatus 102. Electroplating, as used herein, refers to electroplating and related processes, such as electroless plating, chemical etching, electro-polishing, and electrochemical etching processes. The electroplating apparatus 102 may be used to deposit copper or other metals such as tin, nickel, silver, gold, palladium, or the like, on a target object that is dipped into the electrolyte bath. The target object may be semiconductor wafers, connector strips, or the like. The electrolyte bath is composed of one or more dissolved metal salts as well as other ions that permit the flow of electricity. The electrolyte bath includes various components, such as solvents (e.g., water), electrolytes (e.g., salts, acids, and/or bases), and additives (e.g., chloride ions, corrosion inhibitors, levelers, suppressors, brighteners, accelerators, surfactants, and/or wetting agents). The types and concentrations of the various components within the electrolyte bath greatly influence the deposition of metal on the target object that is dipped into the bath. For example, electroplating quality and/or yield can be improved by strictly controlling the component concentrations and other properties (e.g., temperature, pH, conductivity, impedance, etc.) of the electrolyte bath within a corresponding narrow designated operating range, relative to allowing the component concentrations and/or the other properties of the bath to deviate from the designated operating range. In an alternative embodiment, the fluidic processing device 102 is not an electroplating apparatus. For example, the process fluid of the fluidic processing device 102 may be a waste water fluid, an automotive fluid (e.g., transmission fluid, engine oil, etc.), a washing machine fluid, or the like, instead of an electrolyte bath.

The microfluidic chip 114 of the fluid sensing system 104 is fluidly connected to the fluidic processing device 102 to receive fluid samples of the process fluid. For example, the microfluidic chip 114 may be fluidly connected to the fluidic processing device 102 via one or more carrier tubes (not shown) extending between the process fluid within the fluidic processing device 102 and the microfluidic chip 114 exterior of the fluidic processing device 102. In an alternative embodiment, the microfluidic chip 114 may be mounted directly to the fluidic processing device 102 in direct contact with the process fluid within the reservoir of the device 102. For example, the microfluidic chip 114 may be composed of one or more thermoplastic or glass materials that are resistant to acids or bases within the process fluid. The microfluidic chip 114 guides the fluid sample (of the process fluid) through one or more microfluidic channels 120 (shown in FIG. 2) of the chip 114.

The multiple sensors 116 are operatively connected to the microfluidic chip 114 and are configured to measure different corresponding properties of the fluid sample within the one or more microfluidic channels 120 (FIG. 2) of the chip 114. For example, the multiple sensors 116 may be structurally integrated with the microfluidic chip 114, having one or more components (e.g., electrodes, conductive traces, mirrors, etc.) embedded within or mounted to the microfluidic chip 114. In the illustrated embodiment, the microfluidic chip 114 is operatively connected to a pH sensor 116A, a UV-VIS sensor 116B, an IR sensor 116C, and an electrochemistry module sensor 116D. The pH sensor 116A measures the pH of the fluid sample within the microfluidic chip 114. The UV-VIS sensor 116B measures the concentrations of various components of the fluid sample, such as brighteners, organic additives, and/or metallic ions. The IR sensor 116C measures the temperature, and may also measure the concentration of some components of the fluid sample, such as organic additives. The electrochemistry module sensor 116D measures electrical properties of the fluid sample, such as conductivity and impedance. Optionally, the electrochemistry module sensor 116D may also measure pH and/or additive concentration within the fluid sample. The four types of sensors 116A-D shown in FIG. 1 are provided as example sensors and are not intended as an exclusive or exhaustive list of permitted sensors. In one or more alternative embodiments, the microfluidic chip 114 may be operatively connected to additional sensors other than the four illustrated sensors 116A-D, less than all four sensors 116A-D, and/or one or more different types of sensors other than the four sensors 116A-D (e.g., an ultrasound sensor).

The sensors 116 generate data parameters that represent the corresponding monitored properties of the fluid sample of the process fluid. The data parameters are transmitted to the server 106, which stores the data parameters on one or more non-transitory digital memories or storage devices (not shown). The data parameters may be transmitted from the sensors 116 to the server 106 via a wired connection over one or more conductive cables or via a wireless connection using radiofrequency (RF) signals. In an embodiment, the server 106 may be located at a remote location relative to the fluidic processing device 102 and the fluid sensing system 104. For example, the server 106 may be located in a different room within the same building as the sensing system 104, in separate building within the same geographical area (e.g., community, city, or state) as the sensing system 104, or in a different geographical area than the sensing system 104.

The operator I/O devices 108 may wirelessly communicate with the server 106 via a network connection (e.g., Internet, intranet, or the like) to receive the data parameters representative of the monitored properties of the process fluid. For example, the operator I/O devices 108 can access the monitored data parameters via cloud data transfer without being physically near the fluidic processing device 102. As a result, the fluidic processing device 102 can be monitored by multiple operators at different locations. Furthermore, a single operator can access the monitored data parameters of multiple fluidic processing devices 102 via the network connection, which allows the operator to monitor the fluid properties of the multiple fluidic processing devices 102 without being present at the fluidic processing devices 102.

Figure 2:
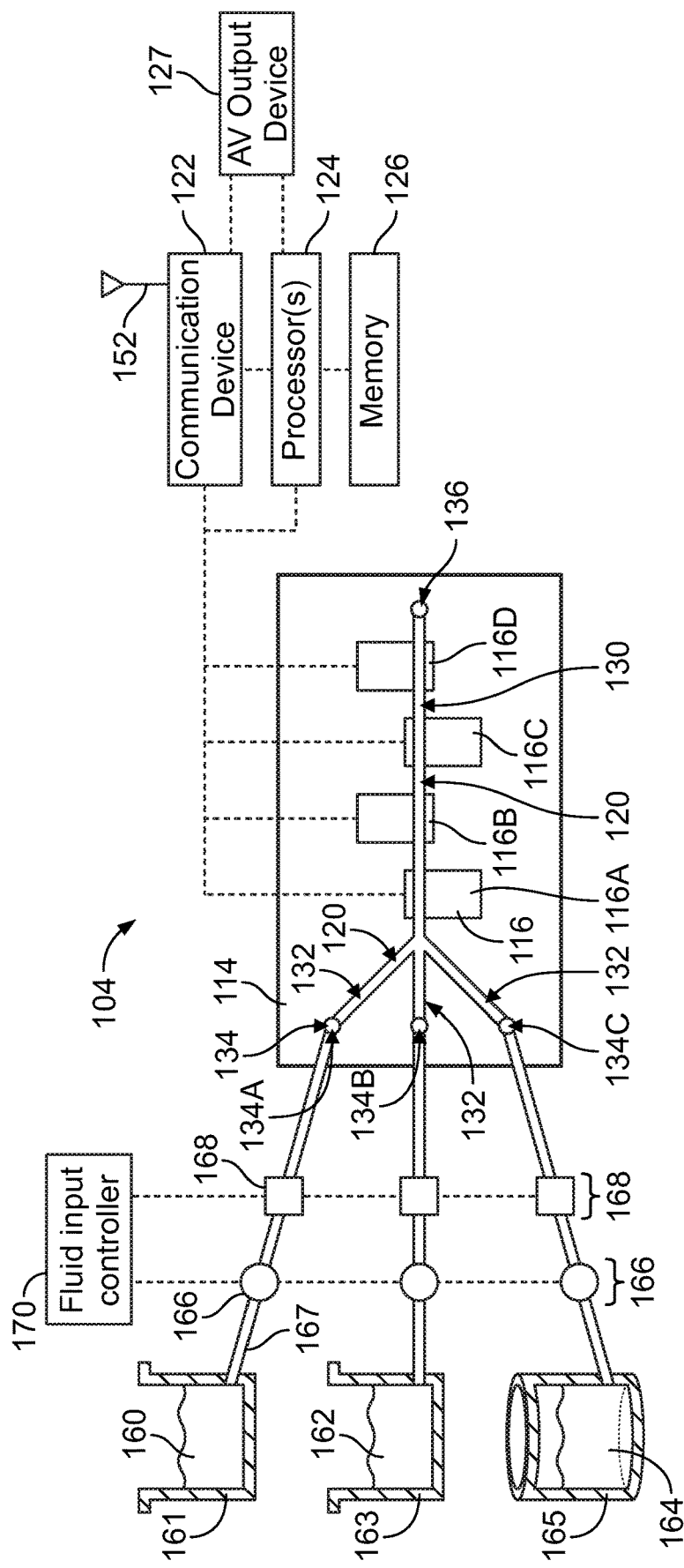
FIG. 2 is a schematic diagram of a fluid sensing system of the monitoring system according to an embodiment.

FIG. 2 is a schematic diagram of the fluid sensing system 104 according to an embodiment. The fluid sensing system 104 includes the microfluidic chip 114, the multiple sensors 116, a communication device 122, one or more processors 124, a digital memory 126, and an audio-visual (AV) output device 127. The one or more processors 124 are microprocessors, field programmable gate arrays, application specific integrated circuits, multi-core processors, or other electronic circuitry that carry out instructions of a computer program by carrying out arithmetic, logical, control, and/or input/output operations specified by the instructions. The memory 126 may be a computer hard disc, read only memory, random access memory, optical disc, removable drive, etc. The memory 126 may store the instructions that are used by the one or more processors 124 to perform the functions described herein. The one or more processors 124, the memory 126, and the AV output device 127 are optional and one or more of these components may be omitted from the fluid sensing system 104 in other embodiments.

The microfluidic chip 114 includes at least one microfluidic channel 120 extending a length through the chip 114. In the illustrated embodiment, the at least one microfluidic channel 120 includes a primary (or first) channel 130 and multiple feeder channels 132 that are fluidly connected to the primary channel 130. The microfluidic channels 120 have cross-sectional dimensions less than one millimeter, such as less than 0.5 mm. For example, the channels 120 may be generally circular and the diameter of the channels 120 is less than one millimeter. In another example, the channels 120 may have a height or width that is less than one millimeter. The primary channel 130 may have a length between 0.5 cm and 15 cm. The microfluidic channels 120 may have volumes that are less than 10 mL (e.g., 10 cm$^3$), less than 5 mL, or less than 1 mL. The small size of the microfluidic channels 120 allows for extracting only small amounts of process fluid from the fluidic processing device 102 (shown in FIG. 1) for analysis, which reduces the interference of the analysis on the fluidic process performance relative to taking larger fluid samples.

The feeder channels 132 are each connected to a corresponding inlet port 134, and the primary channel 130 is connected to an outlet port 136. The fluid sample of the process fluid is received in the microfluidic channels 120 of the microfluidic chip 114 via one or more of the inlet ports 134 and exits the microfluidic chip 114 via the outlet port 136. For example, the ports 134, 136 may be secured to carrier tubes that extend between microfluidic chip 114 and the fluidic processing device 102 (shown in FIG. 1). The three feeder channels 132 converge into the primary channel 130 such that regardless of which inlet port 134 and feeder channel 132 receives the fluid sample, the fluid sample enters the primary channel 130.

In the illustrated embodiment, multiple sensors 116 are arranged relative to the microfluidic chip 114 to measure different properties of the fluid sample within the primary channel 130. There are four sensors 116 in the illustrated embodiment, but additional or fewer sensors may be used in other embodiments. The sensors 116 are illustrated in the schematic diagram as rectangular footprints representing the general locations of the sensors 116 or at least certain components thereof. The components that are located within the footprints may include microchips, electrodes, light emitters, detectors, mirrors, circuitry, and/or the like, depending on the specific sensors 116. The multiple sensors 116 are spaced apart along the length of the primary channel 130 between the feeder channels 132 and the outlet port 136, so the sensors 116 monitor the different corresponding properties of the fluid sample at different locations along the length of the primary channel 130. As the fluid sample flows through the primary channel 130 towards the outlet port 136, the sensors 116 measure different corresponding properties of the fluid sample at different times. For example, the first sensor 116A measures a first property of the fluid sample, and then the second sensor 116B measures a second property of the fluid sample. The third sensor 116C subsequently measures a third property of the fluid sample, followed by the fourth sensor 116D measuring a fourth property of the fluid sample. The properties of the fluid sample measured by the sensors 116A-D may include pH, temperature, conductivity, impedance, component concentrations, and/or the like. In an embodiment, the sensors 116A-D may measure the corresponding properties of the fluid sample continuously, meaning that the properties are measured frequently at rates of at least one measurement every five minutes, every two minutes, every one minute, every thirty seconds, one measurement every ten seconds, one measurement every second, or the like.

Figure 3:
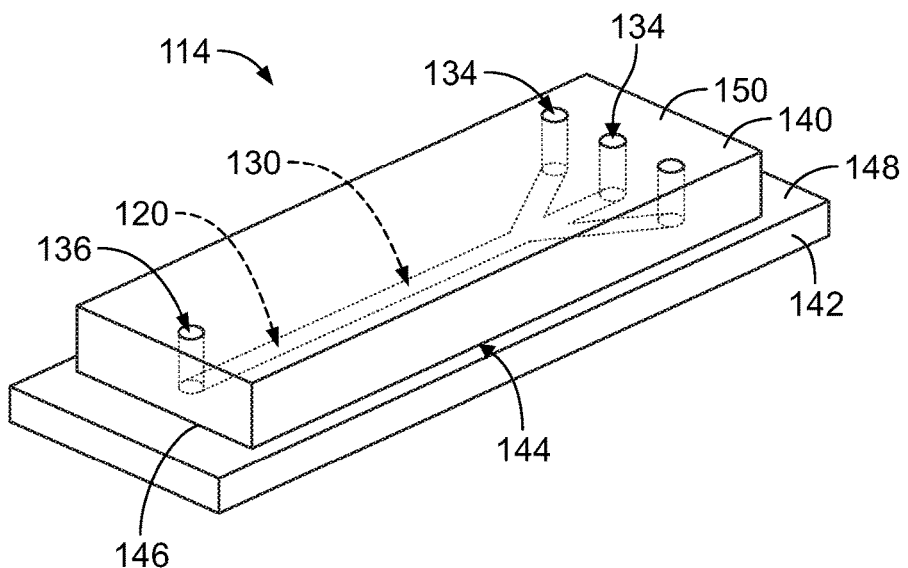
FIG. 3 is a perspective view of a microfluidic chip of the fluid sensing system according to an embodiment.

FIG. 3 is a perspective view of the microfluidic chip 114 according to an embodiment. The microfluidic chip 114 in FIG. 3 is the microfluidic chip 114 of FIG. 2 shown without the sensors 116. The microfluidic chip 114 includes a substrate 140 and a cover 142. The cover 142 is affixed to the substrate 140, such as by bonding, to define the microfluidic chip 114. The cover 142 and the substrate 140 may each be composed of one or more thermoplastic materials (e.g., polyethylene, polycarbonate, polymethyl methacrylate (PMMA), or the like) and/or one or more glass materials. Optionally, the cover 142 and the substrate 140 are composed of the same one or more thermoplastic and/or glass materials or are composed of different materials. In the illustrated embodiment, the microfluidic channels 120 are defined along an interface 144 between the substrate 140 and the cover 142. For example, the channels 120 may be formed as grooves along a bottom surface 146 of the substrate 140 prior to affixing the bottom surface 146 to a top surface 148 of the cover 142 at the interface 144. As used herein, relative or spatial terms such as "top," "bottom," "front," "rear," "upper," and "lower" are only used to distinguish the referenced elements and do not necessarily require particular positions or orientations relative to the surrounding environment. Once the substrate 140 is affixed to the cover 142, the top surface 148 of the cover 142 defines a floor of the microfluidic channels 120. The substrate 140 may be bonded to the cover 142 such that the microfluidic channels 120 are sealed (e.g., hermetically sealed) along the interface 144. Optionally, the microfluidic channels 120 may be defined as grooves along the top surface 148 of the cover 142 instead of, or in addition to, being defined in the substrate 140.

The inlet and outlet ports 134, 136 extend through a thickness of the substrate 140 and are open along a top surface 150 of the substrate 140. The ports 134, 136 may be formed through the substrate 140 by excising portions of the substrate material, such as via drilling. The sensors 116, or components thereof, may be physically mounted to the cover 142 and/or to the substrate 140 to monitor the fluid sample within the microfluidic channels 120. For example, although not shown, the cover 142 and/or the substrate 140 may include various electrodes and electrical circuitry embedded therein. The electrodes and circuitry may be components of specific sensors 116 and/or may be used to convey signals along the microfluidic chip 114, such as from the sensors 116 to the communication device 122. Some of the electrodes may be embedded along the top surface 148 of the cover 142 at the interface 144 and exposed along the primary channel 130 to contact the fluid sample within the primary channel 130. Optionally, one or both of the substrate 140 and the cover 142 may be optically transparent or at least translucent, allowing light to penetrate through the respective material to interact with the fluid sample within the primary channel 130 before impinging on a detector that measures the effect of the fluid sample on the light.

Referring now back to FIG. 2, the multiple sensors 116 are operatively connected to the communication device 122. The sensors 116 may be conductively connected to the communication device 122 via conductive signal paths along conductive traces, wires, cables, or the like. The communication device 122 may be disposed adjacent to the microfluidic chip 114 such that the sensors 116 on the chip 114 are connected to the communication device 122 via one or more electrical (or optical) wires or cables. In another embodiment, the communication device 122 may be mounted directly to the microfluidic chip 114 such that the sensors 116 are connected to the communication device 122 via conductive traces or other embedded circuitry of the microfluidic chip 114. The sensors 116 may convey the data parameters representative of the corresponding measured properties of the fluid sample to the communication device 122 in the form of electrical signals. In an alternative embodiment, the communication device 122 is wirelessly connected to the sensors 116 and receives the data parameters wirelessly via RF signals.

The communication device 122 may include a wireless antenna 152 and associated circuitry and software to communicate wirelessly. The communication device 122 may include a transceiver or, alternatively, a receiver and a separate transmitter. Optionally, the antenna 152 and the associated circuitry of the communication device 122 may be at least partially embedded on the cover 142 and/or the substrate 140 (shown in FIG. 3) of the microfluidic chip 114. The communication device 122 is used to wirelessly transmit status signals including updated measurements of one or more of the monitored properties of the fluid sample to a remote location, such as to the server 106 (shown in FIG. 1), one or more operator I/O devices 108 (FIG. 1), a central computer, or the like. The communication device 122 may transmit the status signals periodically at a designated time interval, such as every minute, every thirty seconds, every ten seconds, every second, or the like. Therefore, a recipient of status messages can receive timely information about the properties of the process fluid that is updated in real-time.

The one or more processors 124 are operatively connected to the tangible and non-transitory computer readable storage medium or memory 126 and are configured to perform operations based on instructions stored on the memory 126. The one or more processors 124 are also operatively connected to the sensors 116 such that the processors 124 receive the data parameters measured by the sensors 116. The data parameters may be received by the one or more processors 124 directly from the sensors 116 or indirectly via the communication device 122. In one embodiment, the one or more processors 124, the memory 126, and the communication device 122 are commonly disposed within a housing. In another embodiment, the one or more processors 124 and the memory 126 are separate from the communication device 122 and not within a common housing. For example, the one or more processors 124 and the memory 126 may be disposed within the server 106 (shown in FIG. 1), a central computer, an operator I/O device 108 (FIG. 1), or the like. In another embodiment, the one or more processors 124 and/or the memory 126 are integrated into the microfluidic chip 114. For example, the one or more processors 124 may be composed of circuitry that is at least partially embedded on the microfluidic chip 114.

The one or more processors 124 are configured to analyze the data parameters generated by the sensors 116. For example, the one or more processors 124 may compare the data parameters to designated threshold ranges for the different measured properties stored in the memory 126 to determine whether the data parameters are within the designated threshold ranges. The designated threshold ranges may be associated with the specific properties that are measured and the specific process fluid that is sampled. The designated threshold ranges represent conditions associated with desired performance of the fluidic process, leading to desired results. For example, in a certain electroplating process the designated threshold range for the temperature of the electrolyte bath may be between 60 and 70 degrees Celsius to provide a desired quality and/or amount of metal coating on the working electrode (that receives the coating). The designated threshold ranges vary for different fluidic processes and different desired results. The threshold ranges may be stored in a database on the memory 126, which is accessed by the one or more processors 124.

In one embodiment, the multiple inlet ports 134 are connected to different fluid sources. For example, a first inlet port 134A may be fluidly connected to a first electrolyte bath 160 in one electroplating reservoir 161, a second inlet port 134B may be fluidly connected to a second electrolyte bath 162 in a different electroplating reservoir 163, and a third inlet port 134C may be fluidly connected to a cleaning fluid 164 in a storage container 165. The cleaning fluid may be a solvent, such as de-ionized water, and optionally may include an additional substance such as a detergent, surfactant, alcohol, or the like. The microfluidic chip 114 is fluidly connected to the different fluid sources via tubing 167.

The fluid sensing system 104 also includes fluid control elements, such as valves 166, pumps 168 (e.g., syringe pumps), and the like, for controlling the selection and flow of the fluids from the different fluid sources to the microfluidic chip 114. The valves 166 and pumps 168 are controlled by a fluid input controller 170. The fluid input controller 170 includes one or more processors (e.g., microprocessors, field programmable gate arrays, application specific integrated circuits, multi-core processors) or other electronic circuitry that carry out instructions of a computer program by carrying out arithmetic, logical, control, and/or input/output operations specified by the instructions. For example, the fluid input controller 170 may operate according to a designated protocol to alternate the supply of fluid from the different electrolyte baths 160, 162 and the cleaning fluid over time in order to provide continuous monitoring of both electrolyte baths 160, 162 without contaminated readings. Although the fluid input controller 170 is shown in FIG. 3 as a single electrical device that controls both the pumps 168 and the valves 166, the fluid input controller 170 in an alternative embodiment may have one electrical device that controls the pumps 168 and a separate electrical device that controls the valves 166.

Figure 4:
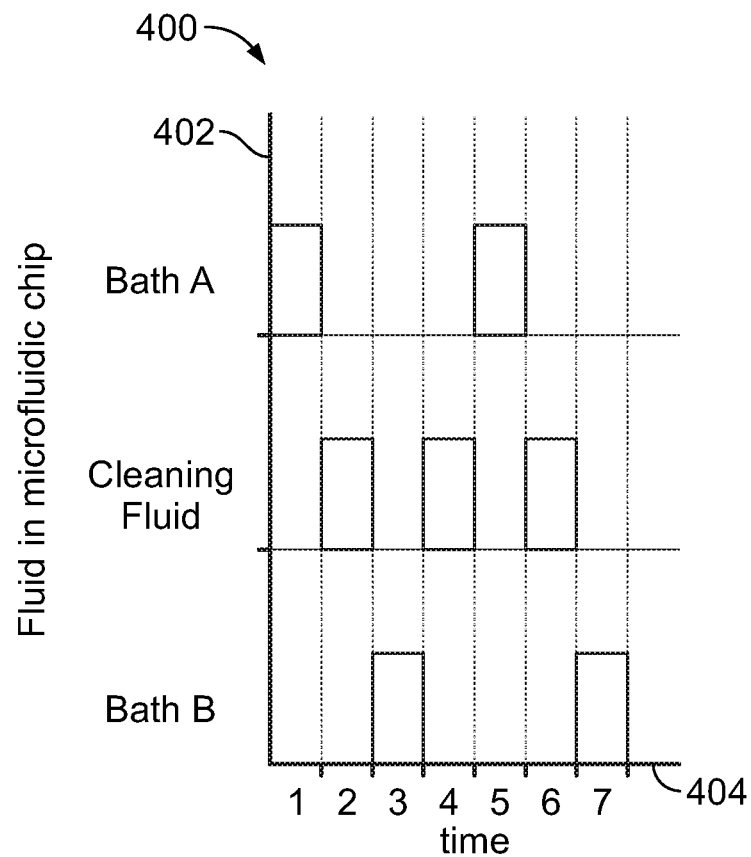
FIG. 4 is a graph showing different fluids flowing through the microfluidic chip over time according to an embodiment.

Additional reference is made to FIG. 4, which is a graph 400 showing different fluids flowing through the microfluidic chip 114 (shown in FIG. 2) over time according to an embodiment. The graph 400 may represent a sequence at which the fluid input controller 170 supplies the different fluids 160, 162, 164 to the microfluidic chip 114 over time according to a designated protocol. The vertical axis 402 shows three different fluid sources including the first electrolyte bath 160 ("Bath A"), the second electrolyte bath 162 ("Bath B"), and the cleaning fluid 164 ("Cleaning Fluid").

The horizontal axis 404 shows seven time periods. Each of the time periods may, but need not, represent the same amount of time as the other time periods. Although seven time periods are shown, the sequence may be repeated for longer than the illustrated seven periods. In the illustrated embodiment, during the first time period, a fluid sample from the first electrolyte bath 160 (e.g., bath A) is flowed through the microfluidic chip 114 in order to monitor multiple properties of the first electrolyte bath 160. For example, the fluid input controller 170 may control the valve 166 and pump 168 between the first electrolyte bath 160 and the microfluidic chip 114 to allow a fluid sample from the bath 160 to flow into the microfluidic chip 114 through the first inlet port 134A, while blocking the flow of the other fluids 162, 164 into the microfluidic chip 114. As a result, the sensors 116 on the microfluidic chip 114 monitor multiple properties of the first electrolyte bath 160 during the first time period.

During the second time period, no more fluid from the first electrolyte bath 160 flows through the microfluidic chip 114. Instead, the fluid input controller 170 directs the cleaning fluid 164 into the microfluidic chip 114 through the inlet port 134C. The cleaning fluid 164 rinses out the primary channel 130 of the microfluidic chip 114 and any electrodes or other components of the sensors 116 exposed to the channel 130 to remove residual amounts of the fluid 160. During the subsequent third time period, the fluid input controller 170 directs a fluid sample from the second electrolyte bath 162 (e.g., bath B) into the microfluidic chip 114 through the inlet port 134B, while the flow of the other two fluids 160 and 164 is blocked. The sensors 116 on the microfluidic chip 114 monitor multiple properties of the second electrolyte bath 162 during the third time period. Afterwards, the cleaning fluid 164 is again flowed through the channels 132, 120 of the microfluidic chip 114 during the fourth time period to rinse out and remove the residual amounts of the fluid 162. The sequence may repeat, such that another fluid sample from the first electrolyte bath 160 is flowed through the microfluidic chip 114 during the fifth time period, the cleaning fluid 164 is flowed through the chip 114 during the sixth time period, and another fluid sample from the second electrolyte bath 162 is flowed through the microfluidic chip 114 during the seventh time period.

In the sequence shown in FIG. 4, the properties of each of the first and second electrolyte baths 160, 162 are monitored by the microfluidic chip 114 once every four time periods. The time periods may have a length of seconds. For example, if the time periods have ten second durations, then there is only thirty seconds of a lag between successive measurements of each of the first and second electrolyte baths 160, 162 (because three time periods separate each successive measurement). Therefore, the fluid sensing system 104 may be configured to monitor fluid samples from multiple different fluidic processes by alternating the source of the fluid samples that flow through the microfluidic chip 114.

In another embodiment, instead of or in addition to monitoring fluid samples from different fluidic processes, the fluid sensing system 104 may monitor fluid samples from multiple different locations within a single fluidic process. For example, the first inlet port 134A may receive a fluid sample extracted from a first region of an electrolyte bath and the second inlet port 134B may receive a fluid sample extracted from a second region of the same electrolyte bath. In this embodiment, Bath A on the vertical axis 402 of the sequencing graph 400 would represent the first region of the electrolyte bath, and Bath B on the vertical axis 402 would represent the second region of the same electrolyte bath. It is recognized that the microfluidic chip 114 is not limited to monitoring fluid properties of electrolyte baths, but can also monitor the fluid properties in other fluidic processes. For example, the first inlet port 134A and the second inlet port 134B may receive alternating fluid samples extracted from a first tube of a closed network of tubes and a second tube of the closed network of tubes.

The fluid sample that flows from the channel 130 through the outlet port 136 may be conveyed through one or more carrier tubes (not shown) back to the source of the fluid sample to recycle the fluid. By performing the analysis of the process fluid on a small sample size of fluid that is recycled back into the process fluid, the interference on the fluidic process that is caused by the monitoring and analysis of the fluid sample may be negligible, or at least significantly less than other systems that extract larger amounts of fluid for testing in multiple instruments.

In an embodiment, the one or more processors 124 are operatively connected to the AV output device 127. The AV output device 127 may be a display device, an audio speaker, a vibration device, or a combination thereof. For example, the AV output device 127 may be a smartphone, a tablet computer, a laptop computer, a desktop computer, or the like. Optionally, the AV output device 127 may be the operator I/O device 108 shown in FIG. 1. In one embodiment, the one or more processors 124 are connected to the AV output device 127 via a wired connection. For example, the one or more processors 124, the memory 126, and the AV output device 127 may represent or be contained within a common computing device, such as a smartphone, a tablet computer, a workstation, or the like. In an alternative embodiment, the one or more processors 124 and the memory 126 are remote from the AV output device 127, and the processors 124 communicate wirelessly with the AV output device 127 via the communication device 122. For example, the processors 124 may generate a signal that is transmitted from the communication device 122 to the AV output device 127 that is carried by or proximate to an operator.

In an embodiment, responsive to the one or more processors 124 determining that one or more of the measured properties of the process fluid are outside of the designated threshold range(s), the one or more processors 124 control the AV output device 127 to generate an alert. The alert may be an audio alarm emitted by a speaker of the device 127, a visual alert presented on a display of the device 127, a vibrational alert generated by a vibration device of the device 127, and/or the like. The one or more processors 124 generate an electrical signal that controls the type of alert provided by the AV output device 127. The alert may also provide information to notify an operator which of the measured properties are outside of the designated threshold range, a degree or extent that such properties are outside of the designated threshold range, suggested or automatically undertaken remedial actions to bring such properties back within the designated threshold range, or the like. For example, the information may be provided by the AV output device 127 in a text-based visual message and/or a voice-based audio message. Since the AV output device 127 may be the I/O device 108 shown in FIG. 1, the fluid sensing system 104 can provide the alerts remotely to operators that are not in the immediate vicinity of the fluidic process. An operator that is in another room or even in another building can receive a notification immediately after the processors 124 determine that one or more of the properties of the process fluid deviate from the designated threshold range.

Figure 5:
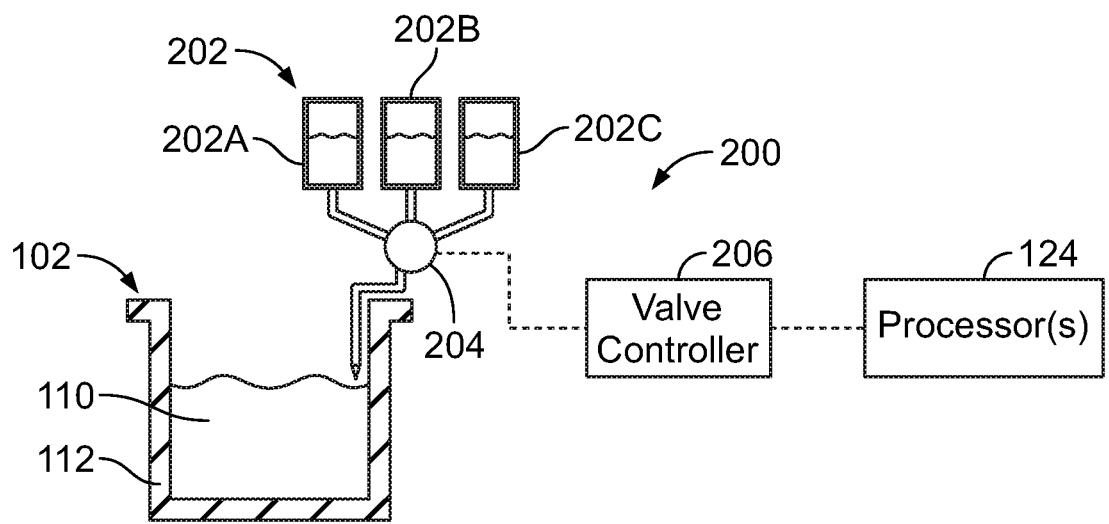
FIG. 5 illustrates the fluidic processing device and a component addition system of the fluid sensing system according to an embodiment.

As a result, the operator is able to take corrective actions in a timely fashion, which can reduce the negative effect of the deviating properties on the fluidic process. The one or more processors 124 optionally may be operatively connected to one or more control devices proximate to the fluidic processing device 102 to provide automatic remedial modifications to the process fluid based on the monitored properties of the fluid sample of the process fluid. For example, FIG. 5 illustrates the fluidic processing device 102 and a component addition system 200 according to an embodiment. The fluidic processing device 102 includes a reservoir 112 that contains the process fluid 110 therein. As described above, the process fluid 110 may be, but is not limited to, an electrolyte bath for electroplating or a similar process. The component addition system 200 includes at least one component receptacle 202 that contains an amount of an ingredient or reagent of the process fluid 110, such as a solvent, an acid, a base, a salt, a metal component, an additive, a mixture or solution of multiple components, or the like. Three component receptacles 202A, 202B, 202C are shown in the illustrated embodiment, and each receptacle 202A-C contains a different component. The component receptacles 202A-C are fluidly connected, via tubing, to a valve system 204 that includes one or more valves for regulating and controlling the flow of the components from the receptacles 202 to the process fluid 110 in the reservoir 112.

The valve system 204 is operatively connected to a valve controller 206 that controls the operations of the valve system 204. The valve controller 206 includes one or more processors (e.g., microprocessors, field programmable gate arrays, application specific integrated circuits, multi-core processors) or other electronic circuitry that carry out instructions of a computer program by carrying out arithmetic, logical, control, and/or input/output operations specified by the instructions. The valve controller 206 may generate and transmit control signals to the valve system 204 to control the flow of the components from the receptacles 202 to the process fluid 110. The valve controller 206 can control the time at which each of the components is added to the process fluid 110, as well as the amount and flow rate of the component. When the fluidic processing device 102 is operating at normal, desired conditions, the valve controller 206 may control the valve system 204 to close all valves, preventing the flow of the components from the receptacles 202 into the process fluid 110. Although the valve system 204 and the valve controller 206 are shown in FIG. 5, the component addition system 200 may include other fluid control elements, such as one or more pumps, to assist in controlling the flow of the components into the reservoir 112.

In an example, the first component receptacle 202A contains a basic component, and the second component receptacle 202B contains an acidic component. In response to the one or more processors 124 determining, based on the monitored properties of the sample fluid in the microfluidic chip 114 (shown in FIG. 2), that the pH of the process fluid 110 is too acidic relative to a designated threshold pH range for the process, the one or more processors 124 communicate a signal to the valve controller 206. In response to receiving the signal, the valve controller 206 may automatically control the valve system 204 to supply the basic component from the receptacle 202A into the reservoir 112 to raise the pH of the process fluid 110. The amount of basic component that is added is controlled such that the resulting pH of the process fluid 110 is within the designated threshold range. The acidic component within the second receptacle 202B is not added into the reservoir 112 since the process fluid 110 is already too acidic. Therefore, the fluid sensing system 104 (shown in FIG. 2) may also include the component addition system 200 shown in FIG. 5 to allow for automatic remedial action without the need for operator intervention.

Alternatively, or in addition, the addition system 200 may include a heating element (not shown) in contact with the process fluid 110. In response to determining that the temperature of the process fluid 110 is below the designated threshold range for the specific process, the one or more processors 124 may automatically activate the heating element (or increase the heat output of an active heating element) to increase the temperature of the process fluid 110 without the need for operator intervention.

Figure 6:
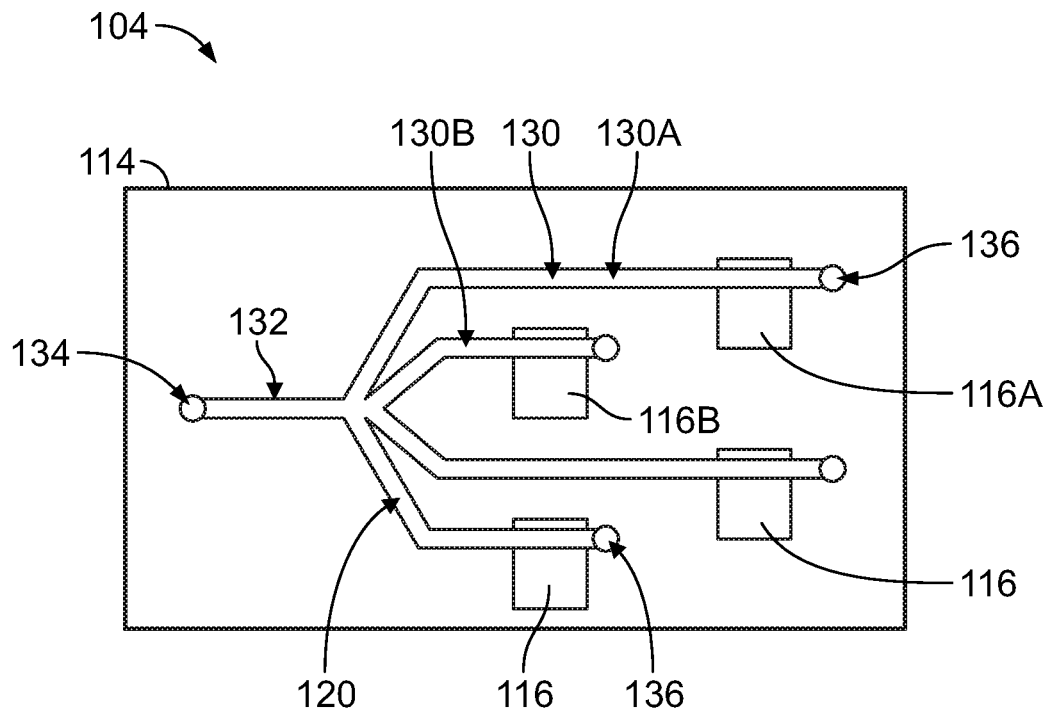
FIG. 6 is a schematic diagram of the microfluidic chip and multiple sensors of the fluid sensing system according to an alternative embodiment.

FIG. 6 is a schematic diagram of the microfluidic chip 114 and the multiple sensors 116 of the fluid sensing system 104 according to an alternative embodiment. The microfluidic chip 114 shown in FIG. 6 differs from the microfluidic chip 114 shown in FIG. 2 in the number and layout of the microfluidic channels 120. The microfluidic chip 114 in the illustrated embodiment includes a single inlet port 134 and a single feeder channel 132. The single feed channel 132 splits into four primary channels 130. The four primary channels 130 extend parallel to one another along respective lengths of the channels 130. The microfluidic chip 114 includes four outlet ports 136 located at the ends of the primary channels 130. The fluid sample may enter the microfluidic chip 114 through the inlet port 134 and flow from the feeder channel 132 into the primary channels 130 before exiting the chip 114 through the outlet ports 136. In the illustrated embodiment, the multiple different sensors 116 are arranged along the microfluidic chip 114 such that each sensor 116 is associated with a different one of the primary channels 130. For example, a first sensor 116A may monitor at least a first property of the fluid sample within a first primary channel 130A, a second sensor 116B may monitor at least a second property of the fluid sample within a second primary channel 130B, and so on. Forming the microfluidic chip 114 to include multiple primary channels 130 that receive the fluid sample that is monitored by the sensors 116 may allow for more space for the sensors 116 as the sensors 116 can be arranged in an array instead of located side-by-side along the length of a single primary channel 130.

Although the microfluidic chip 114 in FIG. 6 includes only one inlet port 134, the microfluidic chip 114 may still monitor the fluid properties of multiple fluidic processes by sequencing or pulsing the flow of fluid through the inlet port 134 over time, as described with reference to FIGS. 2 and 4. For example, a fluid sample from a first electrolyte bath may be directed (by the fluid input controller 170, valves 166, and pumps 168 shown in FIG. 2) through the inlet port 134 during a first time period, a cleaning fluid may be directed through the inlet port 134 during a second time period, and a fluid sample from a second electrolyte bath is directed through the inlet port 134 during a third time period.

Figure 7:
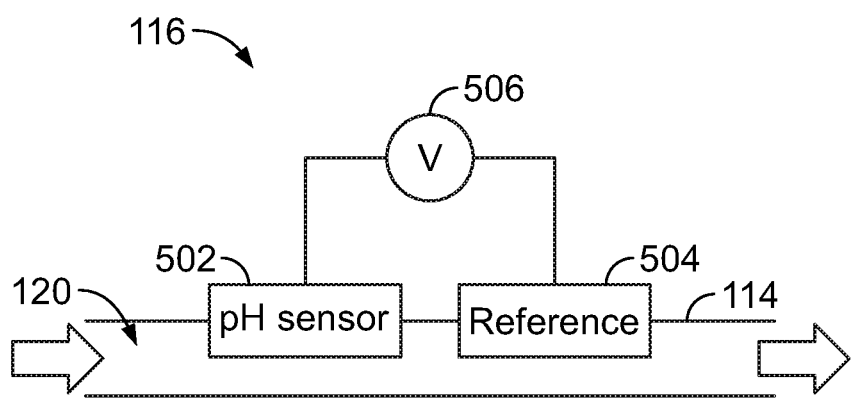
FIG. 7 illustrates an electrochemical module sensor integrated within the microfluidic chip according to an embodiment.

FIG. 7 illustrates an electrochemical module sensor 116 integrated within the microfluidic chip 114 according to an embodiment. The electrochemical module sensor 116 includes a pH sensor 502 and a reference electrode 504 that are both exposed to the fluid sample flowing through the microfluidic channel 120. The pH sensor 502 is spaced apart from the reference electrode 504 along the length of the channel 120. The pH sensor 502 and the reference electrode 504 are both conductively connected to a voltage source 506. The electrochemical module sensor 116 may be used to monitor the pH level of the fluid, the impedance of the fluid, the concentration of one or more components (e.g., additives) of the fluid, and/or the like. The pH sensor 502 and the reference electrode 504 are mounted to the microfluidic chip 114, and may be embedded within the chip 114.

The pH sensor 502 and the reference electrode 504 may include multiple stacked layers of different material compositions. For example, the pH sensor 502 may include a silicon layer stacked on top of an aluminum contact, a silicon oxide layer stacked on top of the silicon layer, and an aluminum oxide layer stacked on top of the silicon oxide layer. The reference electrode 504 in an embodiment includes a silicon oxide layer stacked on top of a silicon layer, and a silver/silver chloride layer stacked on the silicon oxide layer. The generation of an electrical pulse by the voltage source 506 may affect the electromagnetic properties of the fluid sample proximate to the pH sensor 502 and the reference electrode 504, and the change in the properties of the fluid may be used to measure at least one of the pH, the impedance, or component concentrations of the fluid.

Figure 8A:
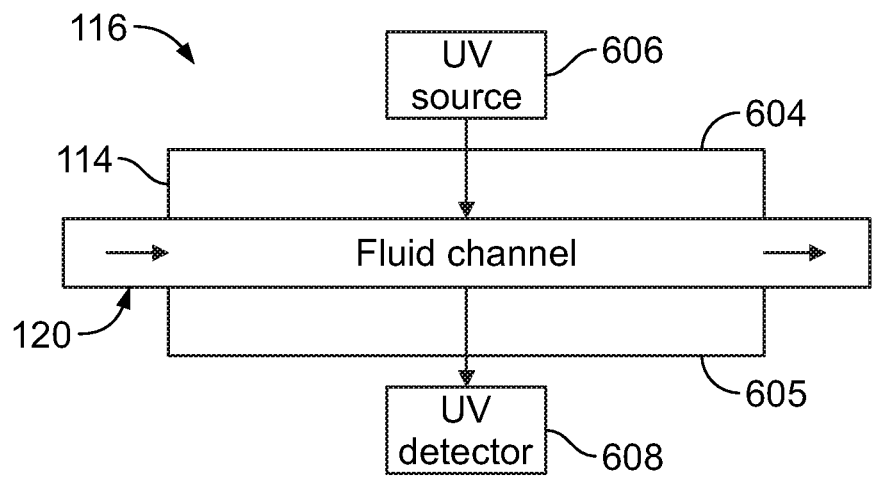
FIGS. 8A, 8B, and 8C illustrate various embodiments of a UV-VIS sensor integrated within the microfluidic chip.
Figure 8B:
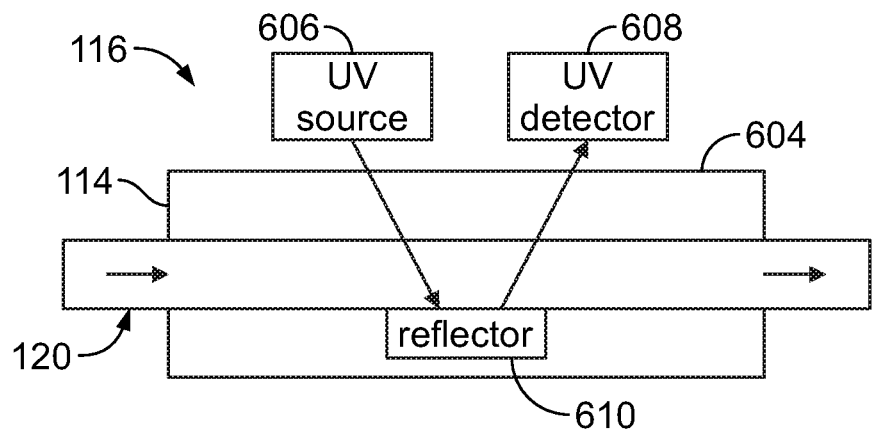
Figure 8C:
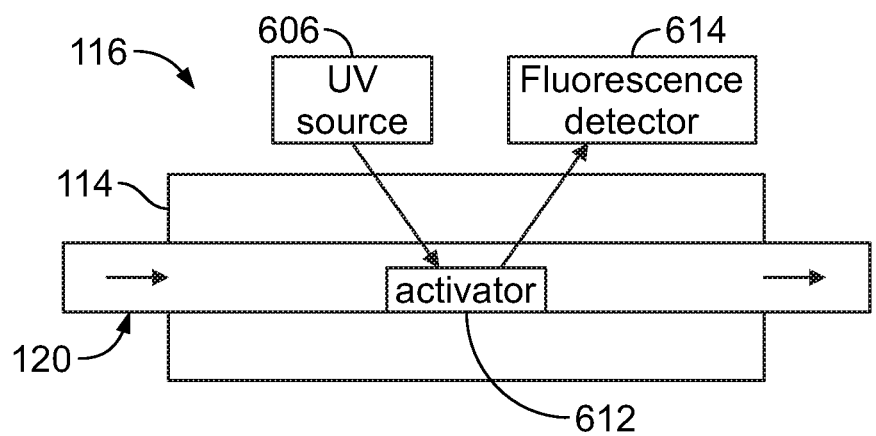

FIGS. 8A, 8B, and 8C illustrate various embodiments of a UV-VIS sensor 116 integrated within the microfluidic chip 114. The UV-VIS sensor 116 is configured to perform ultraviolet spectroscopy measurements on the fluid sample flowing through the corresponding microfluidic channel 120. The UV-VIS sensor 116 in the FIG. 8A operates in a transmission mode. For example, the UV-VIS sensor 116 includes a UV-VIS light or white light source 606 and a UV-VIS detector 608. Although spaced apart from the microfluidic chip 114 in the illustrated embodiment, the UV-VIS light or white light source 606 and the UV-VIS detector 608 may be mounted to the microfluidic chip 114. For example, the UV-VIS or white light source 606 is disposed above the channel 120 and may be connected directly or indirectly to a top side 604 of the microfluidic chip 114. The UV-VIS detector 608 is disposed below the channel 120 and may be connected directly or indirectly to an opposite bottom side 605 of the chip 114. The UV-VIS detector 608 optionally may be a spectrometer. In the transmission mode, the UV-VIS light or white light source 606 emits light in the ultraviolet wavelength range (e.g., between 10 nm and 800 nm or between 10 nm and 1100 nm) that is directed through the microfluidic channel 120 and impinges upon the fluid sample therein. The UV-VIS light or white light passes through the channel 120 and is detected on the other side of the channel 120 by the UV-VIS detector 608, which analyzes the received light. By analyzing how the constituents of the fluid affect the UV-VIS or white light according to spectroscopy techniques, the UV-VIS sensor 116 may be used to monitor concentrations of various components within the fluid, such as plating brighteners, metallic ions, and/or organic additives.

The UV-VIS sensor 116 shown in FIG. 8B operates according to a reflection mode. For example, both the UV-VIS light or white light source 606 and the UV-VIS detector 608 are disposed above the top side 604 of the microfluidic chip 114. A reflector 610 is mounted to the microfluidic chip 114 below the channel 120. The reflector 610 may be a mirror or another reflective film embedded within the chip 114. The UV-VIS light or white light emitted from the light source 606 reflects off the reflector 610 after penetrating through the channel 120 and bounces back towards the UV-VIS detector 608 for analysis.

The UV-VIS sensor 116 shown in FIG. 8C operates according to a fluorescence mode that analyzes fluorescence from the fluid sample. For example, an activator film 612 may be installed within or on the microfluidic channel 120 such that the activator film 612 is exposed to the fluid sample. The activator film 612 may include fluorescent tags or indicators, such as certain organometallic molecules, dyes, or the like. The activator film 612 may also include a reflective layer. The light that is emitted from the UV-VIS source 606 (e.g., between 190 nm and 450 nm) into the microfluidic channel 120 impinges upon the fluid sample and the activator film 612. A fluoresce signal emitted in response is monitored in a fluorescence detector (or fluorometer) 614 for analysis. The fluorescence detector 614 is configured to detect intensity changes, fluorescence peak shifts, and/or ratios of different fluorescence peaks in order to monitor specific properties of the sample fluid, such as pH level and component concentrations. It is recognized that the microfluidic chip 114 may include any of the UV-VIS sensors 116 shown in FIGS. 8A-C.

Figure 9A:
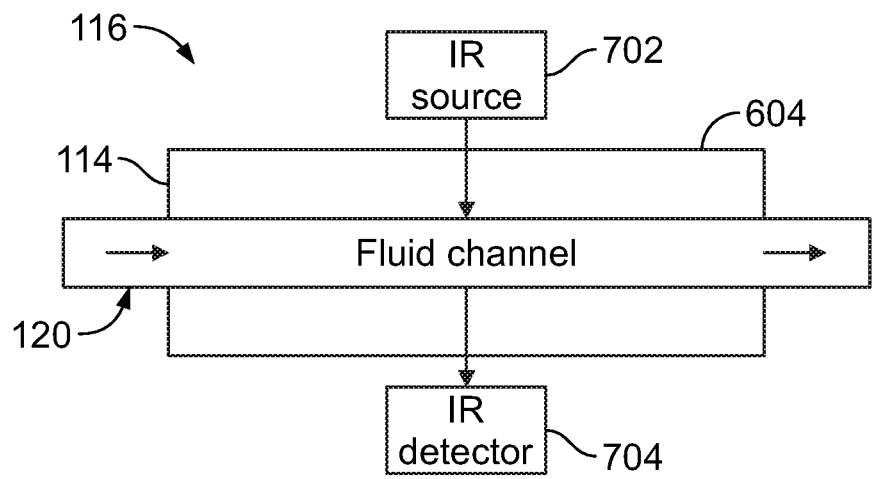
FIGS. 9A and 9B illustrate two embodiments of an IR sensor integrated within the microfluidic chip.
Figure 9B:
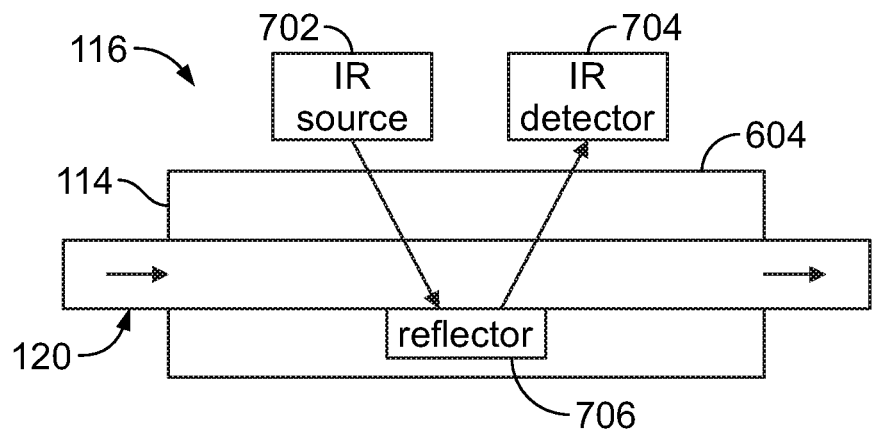

FIGS. 9A and 9B illustrate two embodiments of an IR sensor 116 integrated within the microfluidic chip 114. The IR sensor 116 in both FIGS. 9A and 9B includes an IR emitter or source 702 and an IR detector 704. The IR emitter 702 is disposed above the corresponding microfluidic channel 120, and may be mounted directly or indirectly to a top side 604 of the microfluidic chip 114. The IR emitter 702 generates a laser pulse of infrared radiation which may penetrate through the microfluidic channel 120 to interact with the fluid sample within the channel 120. The IR sensor 116 in FIG. 9A operates in a transmission mode, such that the IR detector 704 is disposed below the channel 120 (e.g., the channel 120 is between the IR emitter 702 and the IR detector 704). In FIG. 9B, the IR sensor 116 operates in a reflection mode, such that the IR detector 704 is on the same side of the channel 120 as the IR emitter 702. Optionally, the IR emitter 702 and the IR detector 704 may be disposed within a common housing. The IR sensor 116 in FIG. 9B includes a reflector 706 to reflect the laser pulse emitted from the IR emitter 702 back towards the IR detector 704. The IR detector 704 receives the laser pulse (e.g., IR radiation) to analyze how the fluid sample affects the properties of laser pulse. Through the analysis, the IR sensor 116 is configured to measure the temperature of the fluid sample, and may also measure concentrations of organic additives and/or other components within the fluid sample. The IR emitter 702 and/or IR detector 704 may be mounted directly or indirectly to the microfluidic cell 114.

Figure 10:
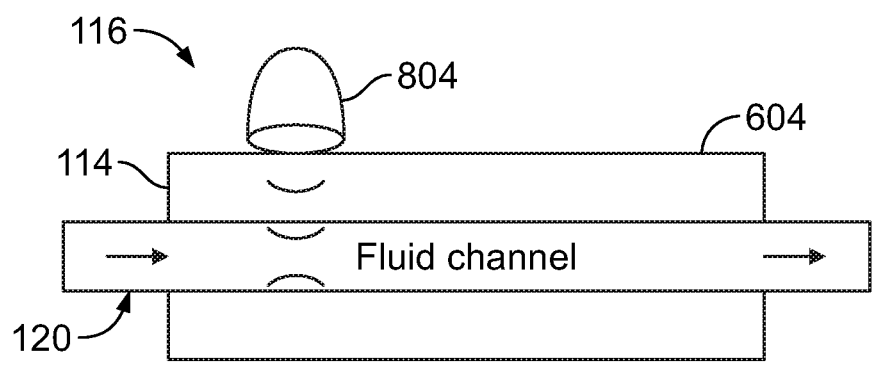
FIG. 10 illustrates an ultrasound sensor integrated within the microfluidic chip according to an embodiment.

FIG. 10 illustrates an ultrasound sensor 116 integrated within the microfluidic chip 114 according to an embodiment. The ultrasound sensor 116 includes a signal transducer 804 that is configured to emit an ultrasonic wave. The signal transducer 804 may be mounted to the microfluidic chip 114, such as to the top side 604 thereof. The signal transducer 804 may include an electrical power supply integrated within the transducer 804 or may be conductively connected to a power source via a wire. In one embodiment, the signal transducer 804 is a transceiver that both transmits the ultrasonic waves and receives reflected ultrasonic waves. The ultrasonic wave is penetrates through the microfluidic channel 120 and the fluid sample therein, and is reflected back to the signal transducer 804. The transducer 804 may convert the received signal (e.g., the reflected ultrasonic wave or echo) into an electrical signal for analysis. The transducer 804 may include internal processors and associated circuitry for analyzing the received signal, or alternatively may transmit the received signal to a discrete detector device which performs the analysis. In an alternative embodiment, the transducer 804 is used only as a transmitter, and the sensor 116 further includes a second transducer that is a receiver. The ultrasound sensor 116 may be used to measure fluidic properties such as fluid level, fluid density, and flow rate through the channel 120.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A fluid sensing system comprising:
 a microfluidic chip including at least one microfluidic channel extending a length through the microfluidic chip, the microfluidic chip fluidly connected to a process fluid such that a fluid sample from the process fluid flows through the at least one microfluidic channel;
 multiple sensors operatively connected to the at least one microfluidic channel of the microfluidic chip, the multiple sensors configured to monitor multiple different properties of the fluid sample within the at least one microfluidic channel; and
 a communication device operatively connected to the multiple sensors, the communication device configured to receive data parameters representative of the multiple different properties of the fluid sample from the multiple sensors and wirelessly transmit the data parameters to a remote location,
 wherein the multiple sensors include at least two of an infrared sensor, a pH sensor, an electrochemistry sensor, an ultraviolet sensor, and an ultrasonic sensor.

2. A fluid sensing system comprising:
 a microfluidic chip including at least one microfluidic channel extending a length through the microfluidic chip, the microfluidic chip fluidly connected to a process fluid such that a fluid sample from the process fluid flows through the at least one microfluidic channel;
 multiple sensors operatively connected to the at least one microfluidic channel of the microfluidic chip, the multiple sensors configured to monitor multiple different properties of the fluid sample within the at least one microfluidic channel; and
 a communication device operatively connected to the multiple sensors, the communication device configured to receive data parameters representative of the multiple different properties of the fluid sample from the multiple sensors and wirelessly transmit the data parameters to a remote location, wherein the multiple different properties of the fluid sample monitored by the multiple sensors includes at least two of pH, temperature, conductivity, impedance, and concentration of various components within the fluid sample.

3. A fluid sensing system comprising:
a microfluidic chip including at least one microfluidic channel extending a length through the microfluidic chip, the microfluidic chip fluidly connected to a process fluid such that a fluid sample from the process fluid flows through the at least one microfluidic channel;
multiple sensors operatively connected to the at least one microfluidic channel of the microfluidic chip, the multiple sensors configured to monitor multiple different properties of the fluid sample within the at least one microfluidic channel; and
a communication device operatively connected to the multiple sensors, the communication device configured to receive data parameters representative of the multiple different properties of the fluid sample from the multiple sensors and wirelessly transmit the data parameters to a remote location,
wherein the process fluid is an electroplating bath.

4. A fluid sensing system comprising:
a microfluidic chip including at least one microfluidic channel extending a length through the microfluidic chip, the microfluidic chip fluidly connected to a process fluid such that a fluid sample from the process fluid flows through the at least one microfluidic channel;
multiple sensors operatively connected to the at least one microfluidic channel of the microfluidic chip, the multiple sensors configured to monitor multiple different properties of the fluid sample within the at least one microfluidic channel; and
a communication device operatively connected to the multiple sensors, the communication device configured to receive data parameters representative of the multiple different properties of the fluid sample from the multiple sensors and wirelessly transmit the data parameters to a remote location,
wherein the at least one microfluidic channel includes a first microfluidic channel and a second microfluidic channel receiving the fluid sample therein, the multiple sensors including a first sensor monitoring one or more properties of the fluid sample within the first microfluidic channel and a second sensor monitoring one or more different properties of the fluid sample within the second microfluidic channel.

5. The fluid sensing system of claim 4, wherein the at least one microfluidic channel has a cross-sectional dimension less than one millimeter.

6. The fluid sensing system of claim 4, wherein the multiple sensors continuously monitor the different properties of the fluid sample, the communication device wirelessly transmitting the data parameters to the remote location in status messages that are transmitted periodically at a designated time interval.

7. The fluid sensing system of claim 4, wherein the microfluidic chip includes a substrate, the one or more microfluidic channels defined at least partially by the substrate, the multiple sensors mounted to the substrate.

8. The fluid sensing system of claim 4, wherein the one or more microfluidic channels are sized to each contain a sample size of no more than one milliliter of the fluid sample.

9. A fluid sensing system comprising:
a microfluidic chip including at least one microfluidic channel extending a length through the microfluidic chip, the microfluidic chip fluidly connected to a process fluid such that a fluid sample from the process fluid flows through the at least one microfluidic channel;
multiple sensors operatively connected to the at least one microfluidic channel of the microfluidic chip, the multiple sensors configured to monitor multiple different properties of the fluid sample within the at least one microfluidic channel;
a communication device operatively connected to the multiple sensors, the communication device configured to receive data parameters representative of the multiple different properties of the fluid sample from the multiple sensors and wirelessly transmit the data parameters to a remote location, and
one or more processors operatively connected to the multiple sensors, the one or more processors configured to compare the properties of the fluid sample monitored by the multiple sensors to designated threshold ranges associated with the corresponding properties for the process fluid to determine whether any of the properties of the fluid sample monitored by the sensors are outside of the corresponding designated threshold range.

10. The fluid sensing system of claim 9, further comprising an audio visual (AV) output device operatively connected to the one or more processors, wherein, responsive to determining that at least one of the properties of the fluid sample are outside of the corresponding designated threshold range, the one or more processors are configured to control the AV output device to generate an alert to notify an operator.

11. The fluid sensing system of claim 9, further comprising a valve controller operatively connected to the one or more processors and to a valve that controls flow of a fluid component from a component receptacle to the process fluid, wherein, responsive to determining that at least one of the properties of the fluid sample are outside of the corresponding designated threshold range, the one or more processors are configured to control the valve controller to open the valve to allow the fluid component to flow from the component receptacle into the process fluid.

12. A fluid sensing system comprising:
a microfluidic chip including at least one microfluidic channel extending a length through the microfluidic chip, the microfluidic chip fluidly connected to an electroplating bath such that a fluid sample from the electroplating bath flows through the at least one microfluidic channel;
multiple sensors operatively connected to the at least one microfluidic channel of the microfluidic chip, the multiple sensors configured to monitor multiple different properties of the fluid sample within the at least one microfluidic channel, the multiple sensors including at least two of an infrared sensor, a pH sensor, an electrochemistry sensor, an ultraviolet sensor, and an ultrasonic sensor; and
a communication device operatively connected to the multiple sensors, the communication device configured to receive data parameters representative of the multiple different properties of the fluid sample from the multiple sensors and wirelessly transmit the data parameters to a remote location.

13. The fluid sensing system of claim 12, wherein the multiple different properties of the fluid sample monitored by the multiple sensors includes at least two of pH, temperature, conductivity, impedance, and concentration of various components within the fluid sample.

14. The fluid sensing system of claim 12, further comprising one or more processors operatively connected to the multiple sensors and to a valve controller, the one or more processors configured to compare the properties of the fluid sample monitored by the multiple sensors to designated threshold ranges associated with the corresponding properties for the electroplating bath, the valve controller configured to control flow of a fluid component from a component receptacle to the electroplating bath, wherein, responsive to the one or more processors determining that at least one of the properties of the fluid sample are outside of the corresponding designated threshold range, the valve controller is configured to open the valve to allow the fluid component to flow from the component receptacle into the electroplating bath.

* * * * *